E. W. MYERS.
CHANGE SPEED MECHANISM FOR MOTOR CYCLES.
APPLICATION FILED APR. 26, 1913.
1,113,814.
Patented Oct. 13, 1914.
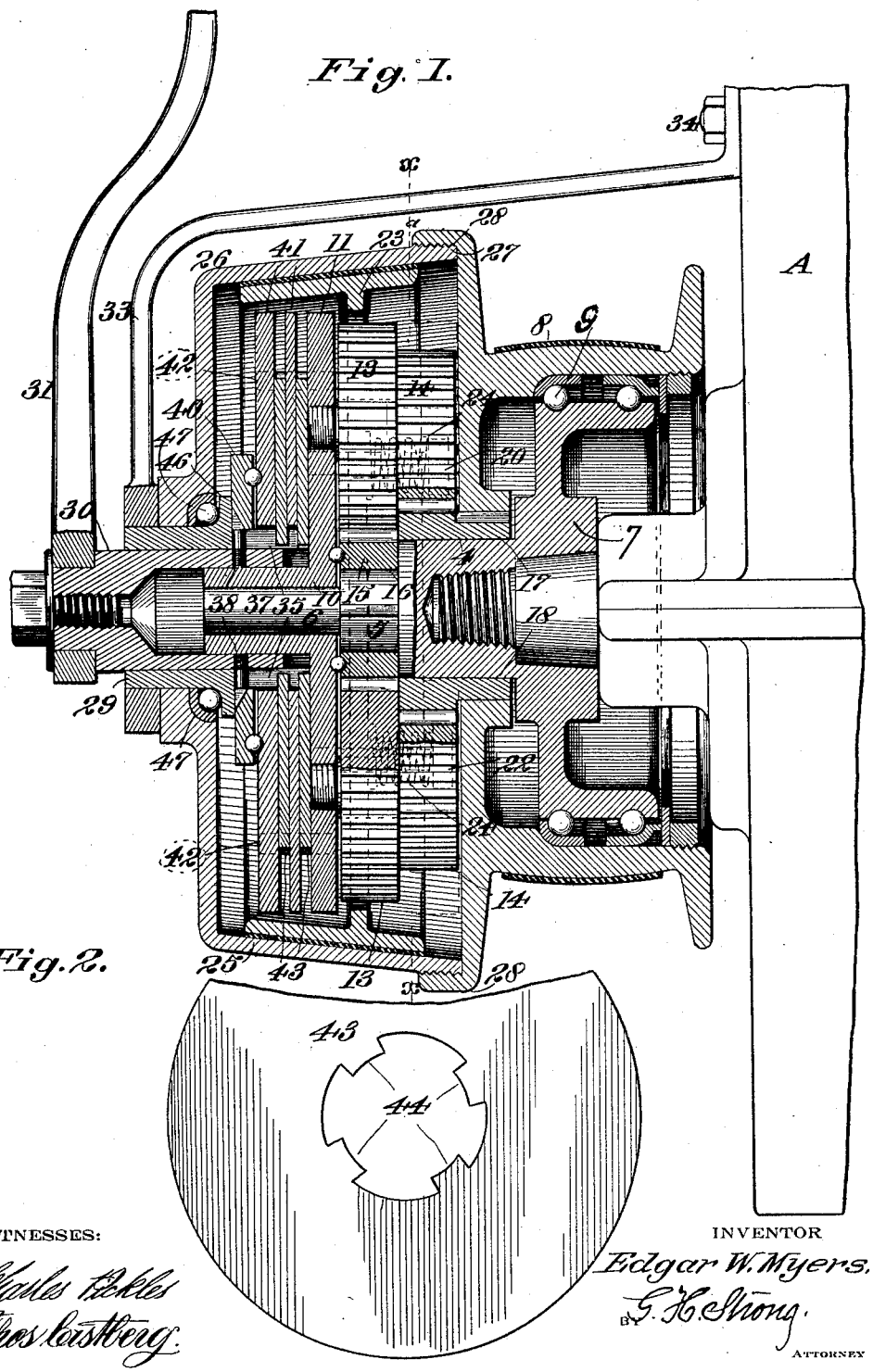

E. W. MYERS.
CHANGE SPEED MECHANISM FOR MOTOR CYCLES.
APPLICATION FILED APR. 26, 1913.
1,113,814.
Patented Oct. 13, 1914.
2 SHEETS—SHEET 2.
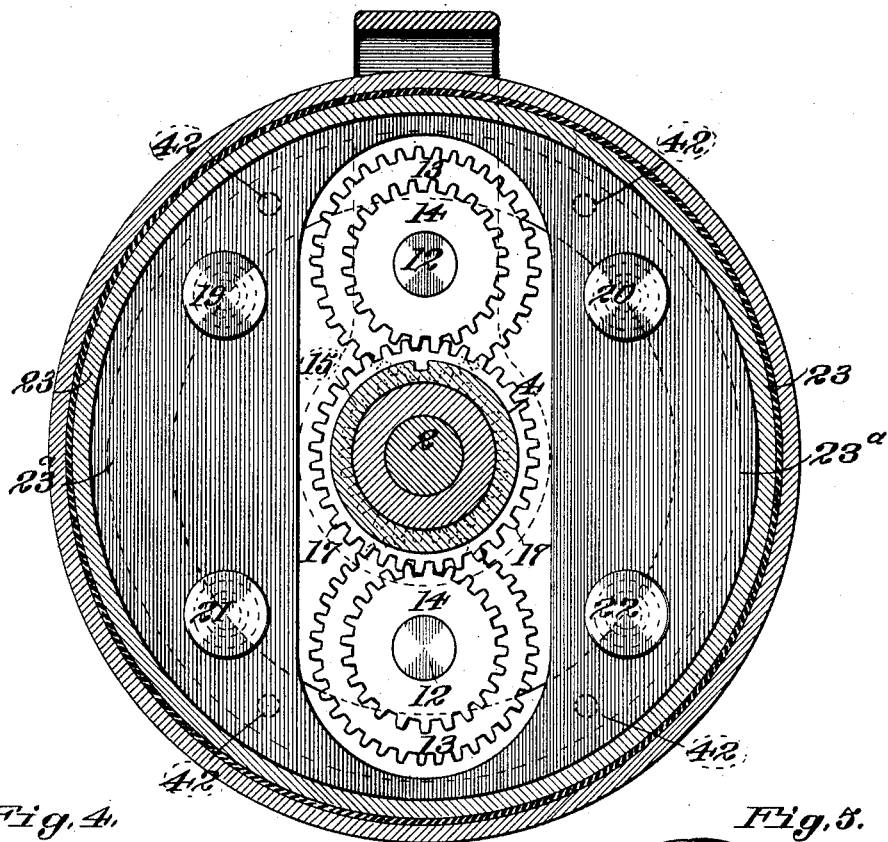
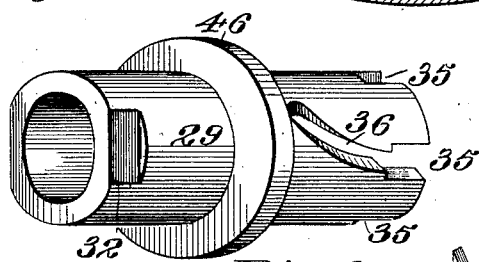
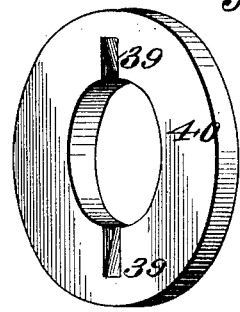
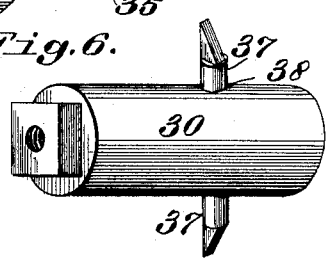
WITNESSES:
INVENTOR
Edgar W. Myers,
BY G. H. Strang.
ATTORNEY

UNITED STATES PATENT OFFICE.

EDGAR W. MYERS, OF SAN JOSE, CALIFORNIA, ASSIGNOR TO RUDOLPH-MYERS MANUFACTURING CO., OF SAN JOSE, CALIFORNIA, A CORPORATION OF CALIFORNIA.

CHANGE-SPEED MECHANISM FOR MOTOR-CYCLES.

1,113,814. Specification of Letters Patent. Patented Oct. 13, 1914.

Application filed April 26, 1913. Serial No. 763,751.

*To all whom it may concern:*

Be it known that I, EDGAR W. MYERS, a citizen of the United States, residing at San Jose, in the county of Santa Clara and State of California, have invented new and useful Improvements in Change-Speed Mechanism for Motor-Cycles, of which the following is a specification.

This invention relates to a variable speed transmission mechanism.

The object of the present invention is to provide a simple, substantial, and compact variable speed transmission mechanism, so constructed as to make it especially adaptable for belt transmission on motorcycles.

A further object of the present invention is to provide suitable adjustments which will automatically take up any wear between the different friction surfaces in the mechanism and which will insure a smooth and silent operation of the different parts.

Another object is generally to improve the mechanism so as to increase its utility, durability and efficiency.

The invention consists of the parts and the construction and combination of parts as hereinafter more fully described and claimed, having reference to the accompanying drawings, in which—

Figure 1 is a central vertical section showing the application of the transmission mechanism to the crank-shaft of a gas engine. Fig. 2 is an end view partly broken away of one of the stationary disks forming part of the multiple disk clutch. Fig. 3 is a cross section on the line *x—x*, Fig. 1. Fig. 4 is a perspective view of the stationary sleeve 28. Fig. 5 is a perspective view of the thrust collar. Fig. 6 is a perspective view of the screw plug.

By referring to Fig. 1 of the drawings, A represents an engine having a crank-shaft 2, to which is secured an extension drive-shaft. The drive-shaft has formed on its outer end a series of offsets 4, 5 and 6 and on its inner end an enlarged annular shoulder extension 7, provided for the purpose of forming a bearing for the belt pulley 8; suitable ball-bearings, as 9, being interposed to reduce friction as much as possible.

Journaled upon the outer reduced extension 6 of the drive-shaft, as at 10, is a disk 11 provided with a pair of stud bolts 12, upon each of which is journaled a pair of connected, intermediate gears 13 and 14. The gears 13 are of larger diameter than the gears 14 and are so positioned as to intermesh with a driving pinion 15 suitably secured, as at 16, on the intermediate reduced section 5 of the extension drive-shaft, while the smaller intermediate gears 14 are adapted to intermesh with a secondary driving gear 17 secured, as at 18, to the belt pulley 8. The disk 10 is also provided with four headed stud bolts 19, 20, 21 and 22, upon which is slidably mounted a cone clutch 23. Interposed between the heads of the bolts and the main supporting web 23ª of the cone clutch member is a series of coil springs 24 provided for the purpose of normally throwing the cone into driving engagement with an opposed clutch face 25, formed on the inner surface of an inclosing housing or casing 26 secured, as at 27, to an internally threaded flange 28 formed on the belt pulley.

Centrally mounted in the housing 26 is a stationary sleeve 29, between which and the hub 10 of the disk 11 is slidably and revolubly mounted a screw plug 30. On the outer end of the screw plug 30 is secured a lever 31 which extends upwardly within convenient reach of the operator. The outer end of the stationary sleeve 29 is provided with a head 32, to which is secured a strap 33 which is secured, as at 34, to the side of the engine casing; this strap being provided for the purpose of preventing any revolving movement of the sleeve 29. The inner end of the sleeve 29 is provided with a series of notches 35 and a pair of tapered grooves or threads 36, through which extends a pair of pins 37 suitably secured, as at 38, to the screw plug 30. The outer ends of the pins 37 extend beyond the grooves 36 in the sleeve 29 into a position where they engage with a pair of slots 39 formed on the rear surface of a thrust collar 40.

Slidably mounted on the notched end of the sleeve 29, between the thrust collar 40 and the disk 11, is a pair of revoluble friction disks 41. The friction disks 41 are connected with the disk 11 by suitable means, as the pins 42, which are secured in the outer friction disk 41, and interposed between the disks 41 is a pair of stationary, slidable friction disks 43 which are provided with inwardly extending lugs 44, so positioned as to interlock with the notches 35 formed on the inner end of the sleeve 29, thus locking the disks 43 against revolving movement. The outer casing or housing 26 being secured, as at 27, to the drive pulley 8, will always revolve in unison with the pulley 8 and is, therefore, journaled, as at 45, on the outer end of the stationary sleeve 29. This sleeve 29 is provided with an annular flange 46, between which and the casing 26 is interposed a ball-bearing 47, thus providing an antifriction bearing for the outer end of the housing 26 which is secured to the pulley 8.

The screw plug 30 is provided for the purpose of advancing or retracting the thrust collar 40 so as to throw the several disks 41 and 43 into or out of engagement with each other. The forward movement of the plug 30 and thrust collar 40 is produced by rocking the lever 31. This will cause the pins 37 to advance in the tapered groove or threads formed in the outer end of the sleeve 29, thus causing the thrust collar to advance and crowd the disks together.

The operation of the device will be as follows: When a direct engine drive is desired, the screw plug will be positioned, as shown in Fig. 1 of the drawings. This will allow the springs 24, interposed between the headed ends of the studs and the web 23ª of the cone, to exert their pressure on the web and cause the cone to be thrown forward into position where it will engage with the inner clutch face 25, formed on the inner surface of the housing 26. The intermediate gears 13 and 14, which are journaled upon the studs 22, are thus caused to interlock with the driving pinion 5 and the gear 17 secured to the pulley, for the reason that the stud bolts, upon which the gears are journaled, are secured to the disk 11, upon which the cone is slidably mounted. The intermediate gears 13 and 14 will thus form a lock between the driving pinion 5 and the secondary driving pinion 17 and cause the several parts to revolve as a unit; the only stationary parts being the screw plug 30, sleeve 29, and intermediate friction disks 43. When it is desired to free the engine, it is only necessary to give the lever arm 31 a slight rocking movement in the direction of arrow b. This will advance the screw plug a sufficient distance to bring the pins 42, secured to the outer disk 41, into engagement with the web 23ª of the cone and force this out of engagement with the inner clutch face 25 formed in the housing 26. The driving pinion, together with the friction disks 41, cone 23 and disk 11, upon which the intermediate gears are mounted, will simply turn loosely about the secondary driving pinion 17 and allow the engine shaft to run freely without transmitting any movement to the pulley 8. However, when it is desired to transmit a two to one drive or half speed, it is only necessary to move the lever 31 a little farther in the same direction. This will cause the pins 37, which engage with the thrust collar 40, to force the thrust collar into such a position that sufficient pressure is exerted to lock the several disks of the multiple disk clutch, thus locking the disk 11, upon which the intermediate gears are journaled, from revolving movement and holding this in a stationary position. At the same time that the disks are thrown into interlocked position or frictional engagement, the pins 42 will engage with the web 23ª and force the cone 23 entirely out of engagement with the clutch face 25 formed within the casing 26. The disk 11, carrying the intermediate gears 13 and 14, being held stationary by the multiple disk clutch will thus permit the driving pinion 5 to transmit movement to the gears 13, which in turn will be transmitted through the smaller intermediate gears 14 to the secondary driving pinion 17, which is secured to the pulley 8, and cause this, together with the connected housing 26, to revolve at a reduced speed in proportion to the gear ratios of the driving pinion and connected gears about the bearings 7 and stationary sleeve 29. The engine may again be released by simply turning the lever 31 in the opposite direction a sufficient distance to disengage the friction disks 41 and 43, and a direct drive may be produced by completely returning the lever 31 into normal position which will allow the friction disks to be entirely disengaged, while the springs 24, surrounding the various stud bolts secured to the disk 11, are permitted to exert their pressure upon the web 23ª of the cone and force this into engagement with the clutch face formed within the casing 26. The engagement of the cone with the clutch face will immediately cause the disk to revolve in unison with the cone as the cone is slidably mounted on the disk and cause the various gears, connected with the driving pinions 5 and 17, and the intermediate gears to form a lock between the same, thus permitting the various parts to revolve as one unit with the engine shaft.

It will be understood that in place of the belt pulley I may use any other suitable form of transmission mechanism, as a gear or sprocket wheel, or any other form of transmission mechanism which may prove desirable.

The different mechanisms here shown provided for the purpose of throwing the different wearing surfaces into engagement, such as the cone and the disks forming the multiple disk clutch, are so contructed as to automatically advance these as wear takes place, thus making the mechanism foolproof and eliminating the application of any adjusting means which would necessitate constant inspection and adjustment.

The springs 24, actuating the forward or engaging movement of the cone 23, will simply expand as the wearing face of the cone increases, thus producing an automatic take-up which will adjust itself to any wear between the different friction surfaces. The tapered grooves or threads 36, formed in the outer end of the slot 39, are of sufficient length to allow the pins 37, secured on the screw plug 30, to advance sufficiently to take up any wear produced between the various disks forming the multiple disk clutch, thus eliminating any adjustments at this point.

The transmission mechanism here shown is simple and compact in construction and is sufficiently provided with antifriction bearings to permit a high efficiency and perfect, smooth, uniform and noiseless operation.

The materials and finish of the several parts of the mechanism are such as experience and judgment of the manufacturer may dictate.

Having thus described my invention, what I claim and desire to secure by Letters Patent is—

1. A variable speed transmission gearing for motorcycles, comprising a drive-shaft, a driving pinion secured to the shaft, a transmission pulley journaled on the shaft, a secondary driving pinion secured to the pulley, a disk 11 journaled on the shaft, a pair of stud bolts secured to said disk, a pair of intermediate gears on each stud bolt intermeshing with the driving pinion and the secondary pinion, a clutch member secured to the transmission pulley, a cone clutch member slidably mounted on studs projecting from disk 11 adapted to engage with the clutch member, means for throwing the clutch members into engagement to transmit motion from the driving pinion to the transmission pulley, and means for holding the cone clutch member stationary to transmit motion at another speed to the transmission pulley.

2. A variable speed transmission gearing for motorcycles, comprising a drive-shaft, a driving pinion secured to the shaft, a transmission pulley journaled on the shaft, a secondary driving pinion secured to the pulley, a disk 11 journaled on the shaft, a pair of stud bolts secured to said disk, a pair of intermediate gears on each stud bolt intermeshing with the driving pinion and the secondary pinion, a clutch member secured to the transmission pulley, a cone clutch member slidably mounted on studs projecting from disk 11 adapted to engage with the clutch member, springs surrounding the studs upon which the cone is slidably mounted adapted to normally force the cone into engagement with the clutch member, a multiple disk clutch having a stationary member and adapted to engage with the disk 11, and means for throwing the multiple disk clutch into and out of engagement with the disk 11.

3. A variable speed transmission gearing for motorcycles, comprising a drive-shaft, a driving pinion secured to the shaft, a transmission pulley journaled on the shaft, a secondary driving pinion secured to the pulley, a disk 11 journaled on the shaft, a pair of stud bolts secured to said disk, a pair of intermediate gears on each stud bolt, intermeshing with the driving pinion and the secondary pinion, a clutch member secured to the transmission pulley, a cone clutch member slidably mounted on studs projecting from disk 11 adapted to engage with the clutch member, springs surrounding the studs upon which the cone is slidably mounted adapted to normally force the cone into engagement with the clutch member, a screw plug slidably and revolubly mounted on the outer end of the drive-shaft, a sleeve surrounding said plug, means for securing the sleeve against revolving movement, said sleeve having grooves formed in the outer end, a plurality of stationary disks having downwardly extending lugs engaging with said grooves slidably mounted on the sleeve, a plurality of revoluble disks mounted on the sleeve interposed between the stationary disks, means connecting the revoluble disks with the disk 11, and means on the screw plug for throwing the several disks into and out of engagement with the disk 11.

4. A two speed transmission gearing for motorcycles, including a shaft, a driving pulley mounted thereon, a driving pinion on the shaft and a second pinion carried by the pulley, a disk on the shaft and gears carried thereby and intermeshing with the above named pinions, cone clutch members upon the transmission pulley and the disk, and a multiple disk clutch having one stationary member, and means to engage said clutch with the before mentioned disk.

In testimony whereof I have hereunto set my hand in the presence of two subscribing witnesses.

EDGAR W. MYERS.

Witnesses:
JOHN H. HERRING,
W. W. HEALEY.

Copies of this patent may be obtained for five cents each, by addressing the "Commissioner of Patents, Washington, D. C."